(12) United States Patent
Soeda et al.

(10) Patent No.: US 12,148,890 B2
(45) Date of Patent: Nov. 19, 2024

(54) METHOD FOR PRODUCING ELECTROLYTE SOLUTION

(71) Applicant: THE SCHOOL CORPORATION KANSAI UNIVERSITY, Suita (JP)

(72) Inventors: Kazunari Soeda, Suita (JP); Masashi Ishikawa, Suita (JP); Masaki Yamagata, Suita (JP)

(73) Assignee: THE SCHOOL CORPORATION KANSAI UNIVERSITY, Suita (JP)

( * ) Notice: Subject to any disclaimer, the term of this patent is extended or adjusted under 35 U.S.C. 154(b) by 0 days.

(21) Appl. No.: 17/993,238

(22) Filed: Nov. 23, 2022

(65) Prior Publication Data

US 2023/0089709 A1 Mar. 23, 2023

Related U.S. Application Data

(62) Division of application No. 16/481,892, filed as application No. PCT/JP2018/001585 on Jan. 19, 2018, now abandoned.

(30) Foreign Application Priority Data

Jan. 31, 2017 (JP) .................. 2017-016222

(51) Int. Cl.
H01M 10/0569 (2010.01)
H01M 10/054 (2010.01)
H01M 10/0568 (2010.01)

(52) U.S. Cl.
CPC ..... *H01M 10/0569* (2013.01); *H01M 10/054* (2013.01); *H01M 10/0568* (2013.01); *H01M 2300/0028* (2013.01)

(58) Field of Classification Search
None
See application file for complete search history.

(56) References Cited

U.S. PATENT DOCUMENTS

2009/0068568 A1* 3/2009 Yamamoto ........ H01M 10/0568
429/340
2013/0337328 A1* 12/2013 Yamamoto ............ H01M 4/587
429/220

(Continued)

FOREIGN PATENT DOCUMENTS

JP 2004-345970 A 12/2004
JP 2009-064730 A 3/2009

(Continued)

OTHER PUBLICATIONS

JP2013037993A translation (Year: 2013).*

(Continued)

*Primary Examiner* — Ula C Ruddock
*Assistant Examiner* — Amanda Rosenbaum
(74) *Attorney, Agent, or Firm* — McCarter & English, LLP; David G. Conlin; Yelena Margolin

(57) ABSTRACT

The present invention provides a method for producing an electrolyte which is capable of retaining a high magnesium ion concentration. A method for producing an electrolyte in accordance with an aspect of the present invention comprises the step of: mixing a solvent, metal magnesium, and an elemental halogen, the metal magnesium being a metal containing magnesium in an amount of not less than 96% by weight with respect to 100% by weight of a total weight of the metal.

7 Claims, 7 Drawing Sheets

(56) References Cited

U.S. PATENT DOCUMENTS

| | | | |
|---|---|---|---|
| 2014/0099557 A1* | 4/2014 | Doe | H01M 10/054 |
| | | | 429/328 |
| 2014/0127594 A1 | 5/2014 | Nakayama et al. | |
| 2014/0182680 A1* | 7/2014 | Kawata | H01G 9/2013 |
| | | | 136/263 |
| 2016/0028117 A1* | 1/2016 | Oh | H01M 10/0568 |
| | | | 429/337 |
| 2016/0126589 A1 | 5/2016 | Xiao et al. | |
| 2016/0380310 A1* | 12/2016 | Nakayama | H01M 10/054 |
| | | | 180/65.1 |
| 2017/0179532 A1* | 6/2017 | Archer | H01M 10/052 |
| 2017/0331154 A1* | 11/2017 | Sato | H01M 10/0569 |
| 2019/0393555 A1 | 12/2019 | Soeda et al. | |

FOREIGN PATENT DOCUMENTS

| | | | |
|---|---|---|---|
| JP | 2013037993 A * | 2/2013 | |
| JP | 2014-072031 A | 4/2014 | |

OTHER PUBLICATIONS

International Search Report for Application No. PCT/JP2018/001585, dated Apr. 3, 2018, 2 pages.
International Preliminary Report on Patentability for Application No. PCT/JP2018/001585, dated Aug. 15, 2019, 7 pages.

* cited by examiner

METHOD FOR PRODUCING ELECTROLYTE SOLUTION

CROSS-REFERENCE TO RELATED APPLICATIONS

This application is a divisional of U.S. patent application Ser. No. 16/481,892, filed Jul. 30, 2019, which is a U.S. national phase application, pursuant to 35 U.S.C. § 371, of PCT/JP2018/001585, filed Jan. 19, 2018, which claims priority to Japanese Application No. 2017-016222, filed Jan. 31, 2017. The entire contents of the aforementioned patent applications are incorporated herein by this reference.

TECHNICAL FIELD

The present invention relates to an electrolyte, a secondary battery, and a method for producing the electrolyte. More specifically, the present invention relates to an electrolyte containing magnesium, a secondary battery, and a method for producing the electrolyte.

BACKGROUND ART

A lithium ion secondary battery is currently in wide use as a secondary battery. On the other hand, a magnesium secondary battery in which magnesium is used for a negative electrode is attracting attention as a "next-generation secondary battery." The magnesium secondary battery has advantages over the lithium ion secondary battery such as a greater amount of available electricity per volume, greater availability and inexpensiveness of metal resource, and superior safety in the air.

In the magnesium secondary battery, metal magnesium is dissolved as magnesium ions during discharge, and magnesium ions are in turn deposited as metal magnesium during charge. As such, an electrolyte for the magnesium secondary battery is required to have characteristics of both (i) retaining a sufficient amount of magnesium ions and (ii) efficiently causing a dissolution reaction and a deposition reaction with the negative electrode (metal magnesium).

As an example of such an electrolyte, Patent Literature 1 discloses an electrolyte obtained by dissolving a magnesium salt in a solvent consisting of sulfone. Patent Literature 1 also discloses, as a method for producing the electrolyte, a production method including (1) a step of dissolving a magnesium salt in a low-boiling solvent (e.g., alcohol) in which the magnesium salt is dissolvable, (2) a step in which sulfone is dissolved in a solution obtained in the step (1), and (3) a step in which the low-boiling solvent is removed from a solution obtained in the step (2).

Further, Patent Literature 2 discloses an ion-conducting medium containing a magnesium ion, a halogen, and a nonaqueous solvent. According to Patent Literature 2, the halogen and the nonaqueous solvent form a molecular complex in the ion-conducting medium.

CITATION LIST

Patent Literature

[Patent Literature 1]
Japanese Patent Application Publication Tokukai No. 2014-072031 (Publication date: Apr. 21, 2014)

[Patent Literature 2]
Japanese Patent Application Publication Tokukai No. 2013-037993 (Publication date: Feb. 21, 2013)

SUMMARY OF INVENTION

Technical Problem

However, the above-described conventional technology has room for improvement in terms of battery output, since it is not possible to achieve a sufficiently high concentration of the magnesium ion in the electrolyte.

It is an object of an aspect of the present invention to provide an electrolyte which is capable of retaining a high magnesium ion concentration.

Solution to Problem

The inventors of the present invention have discovered that the above problem is solved by an electrolyte produced by a method in which metal magnesium and an elemental halogen are dissolved in a solvent. That is, the present invention encompasses the following:

<1>
An electrolyte, obtained by mixing a solvent, metal magnesium, and an elemental halogen.
<2>
The electrolyte as set forth in <1>, containing the solvent, a magnesium ion, and a halide ion.
<3>
The electrolyte as set forth in <1> or <2>, containing the magnesium ion in an amount of not more than 0.5 mol/L relative to a total amount of the electrolyte.
<4>
The electrolyte as set forth in any one of <1> through <3>, wherein the number of magnesium atoms having a coordination number of 4 is not less than 95% of the number of all magnesium atoms when the electrolyte is analyzed by soft X-ray fluorescence XAFS method.
<5>
The electrolyte as set forth in <1> through <4>, wherein the solvent is an organic solvent or an ionic liquid.
<6>
The electrolyte as set forth in any one of <1> through <5>, wherein the solvent is a sulfone solvent.
<7>
The electrolyte as set forth in any one of <1> through <6>, containing a bromide ion or an iodide ion as the halide ion.
<8>
A secondary battery, including an electrolyte according to any one of <1> through <7>.
<9>
A method for producing an electrolyte, including the step of: mixing a solvent, metal magnesium, and an elemental halogen.
<10>
The method as set forth in <9>, wherein the electrolyte contains a magnesium ion in an amount of not less than 0.5 mol/L relative to a total amount of the electrolyte.
<11>
The method as set forth in <9> or <10>, wherein the number of magnesium atoms having a coordination number of 4 is not less than 95% of the number of all magnesium atoms when the electrolyte is analyzed by soft X-ray fluorescence XAFS method.
<12>
The method as set forth in any one of <9> through <11>, wherein the solvent is an organic solvent or an ionic liquid.

<13>

The method as set forth in any one of <9> through <12>, wherein the solvent is a sulfone solvent.

<14>

The method as set forth in any one of <9> through <13>, wherein the elemental halogen is a bromine molecule or an iodine molecule.

Advantageous Effects of Invention

According to an aspect of the present invention, it is possible to provide an electrolyte which is capable of retaining a high magnesium ion concentration.

BRIEF DESCRIPTION OF DRAWINGS (a) of FIG. 1 is a cyclic voltamogram indicating a result of cyclic voltammetry of an electrolyte in accordance with an embodiment of the present invention. (b) of FIG. 1 is a cyclic voltamogram of electrolyte disclosed in the prior art (Patent Literature 1).

(a) of FIG. 2 is an electron microscopic image of metal magnesium deposits resulting from passing an electric current through an electrolyte in accordance with an embodiment of the present invention. A bright portion is deposited metal magnesium, and a dark portion is nickel of the substrate. (b) of FIG. 2 is an element mapping image obtained by analyzing the same area as that in (a) of FIG. 1 by energy dispersive X-ray spectroscopy (EDX) and representing elements in the area with use of respective different colors. (c) of FIG. 2 illustrates an analysis result of (b) of FIG. 2 as a mapping spectrum.

FIG. 3 is a graph indicating results of analysis conducted by soft X-ray fluorescence XAFS method with respect to an electrolyte in accordance with an embodiment of the present invention (solid line) and a magnesium perchlorate aqueous solution (broken line). Note that the broken line serves as a reference curve indicating an analysis result corresponding to a case in which six solvent molecules are coordinated around a magnesium atom.

(a) of FIG. 4 is a graph indicating progresses in an early stage (1st cycle to 10th cycle) in a case where an electrolyte in accordance with an embodiment of the present invention was subjected to a constant current charge and discharge test under conditions of an assumed case in which a battery including the electrolyte operates. (b) of FIG. 4 is a graph indicating progresses in a late stage (5011th cycle to 5014th cycle) of the same test as in (a) of FIG. 4.

Figure 7:
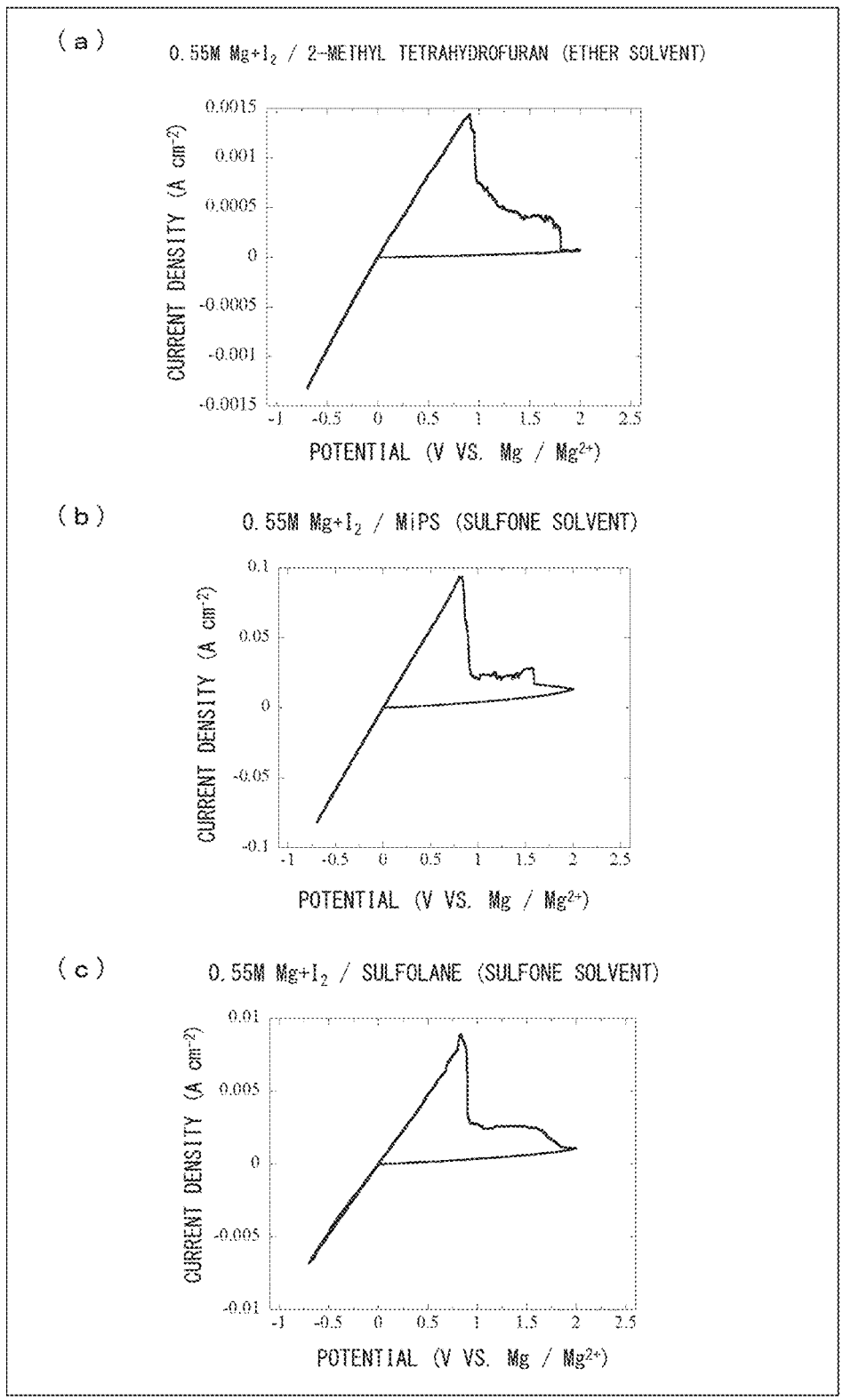

(a) through (c) of FIG. 7 are each a cyclic voltamogram indicating a result of cyclic voltammetry of an electrolyte in accordance with another embodiment of the present invention, wherein the type of solvent is changed among (a) through (c) of FIG. 7.

Figure 8:
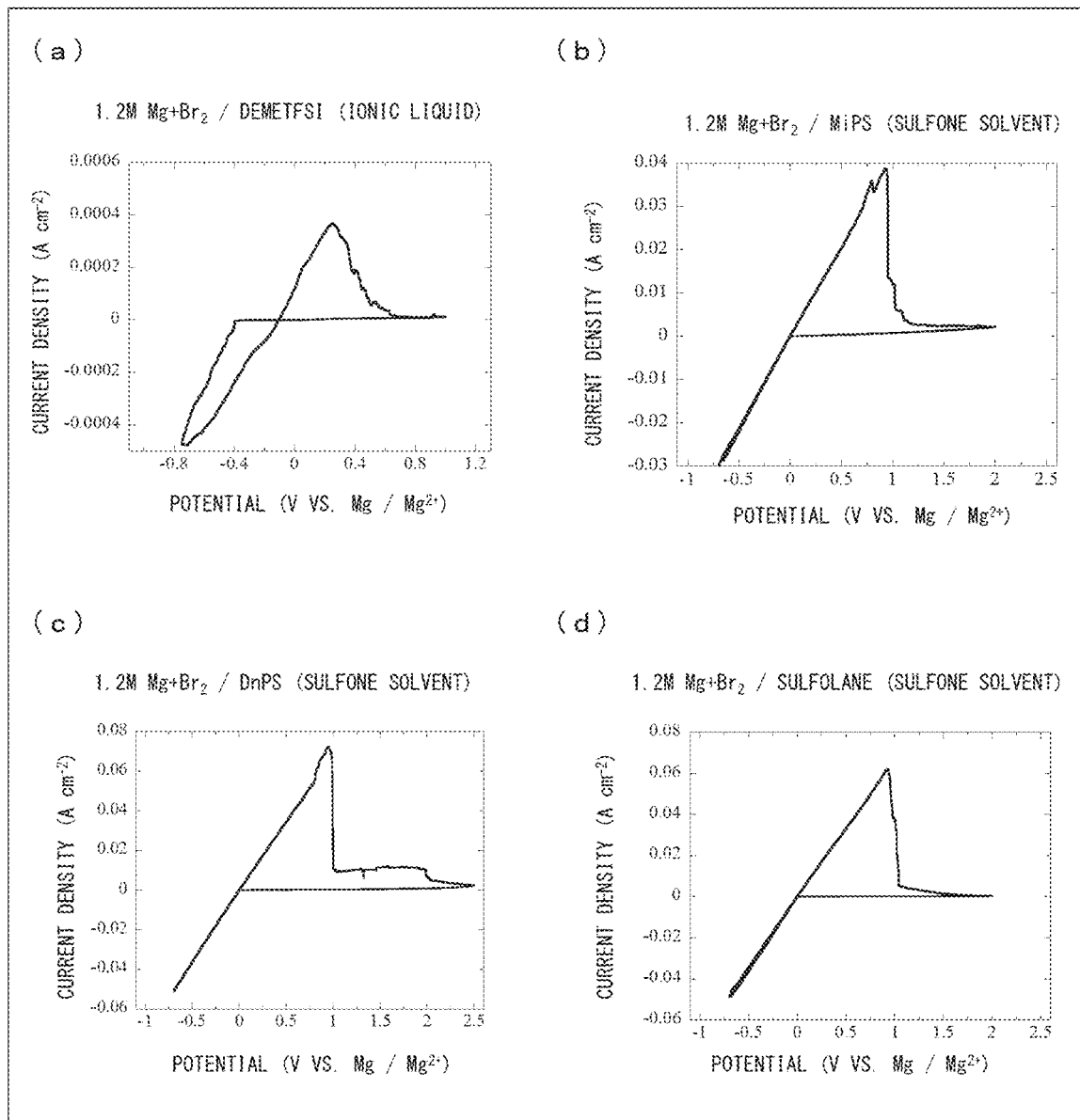

(a) through (d) of FIG. 8 are each a cyclic voltamogram indicating a result of cyclic voltammetry of an electrolyte in accordance with still another embodiment of the present invention with use of a different elemental halogen, wherein the type of solvent is changed among (a) through (d) of FIG. 8.

DESCRIPTION OF EMBODIMENTS

The following description will discuss an embodiment of the present invention. Note, however, that the present invention is not limited to such an embodiment. The present invention is not limited to the description of the arrangements below, but may be altered in various ways by a skilled person within the scope of the claims. The present invention also encompasses, in its technical scope, any embodiment or example derived by combining technical means disclosed in differing embodiments or examples. All of the documents cited herein are incorporated herein by reference.

Any numerical range "A to B" expressed herein intends to mean "not less than A and not more than B".

An electrolyte in accordance with an embodiment of the present invention is an electrolyte obtained by mixing a solvent, metal magnesium, and an elemental halogen. The electrolyte in accordance with an embodiment of the present invention is also an electrolyte containing the solvent, a magnesium ion, and a halide ion. Each of these components will be described below in order.

[1. Solvent]

A solvent contained in an electrolyte in accordance with an embodiment of the present invention is not particularly limited, provided that the solvent is typically used in production of an electrolyte. Examples of such a solvent encompass an organic solvent, an ionic liquid, and the like.

Specific examples of the organic solvent encompass a sulfone solvent (dimethyl sulfone, methyl isopropyl sulfone, ethyl methyl sulfone, ethyl isopropyl sulfone, ethyl isobutyl sulfone (EiBS), dipropyl sulfone, isopropyl-s-butyl sulfone (iPsBS), isopropyl isobutyl sulfone (iPiBS), butyl isobutyl sulfone (BiBS), sulfolane, or the like), an ether solvent (2-methyl tetrahydrofuran, dimethoxyethane, dioxolane, monoglyme (G1), diglyme (G2), triglyme (G3), tetraglyme (G4) or the like), and the like. Other examples of the ether solvent encompass a mixed solvent of dimethoxyethane and dioxolane. From the viewpoint of imparting an excellent electrochemical property to the electrolyte, the organic solvent, among the above examples of the sulfone solvent, is preferably methyl isopropyl sulfone, ethyl isopropyl sulfone, dipropyl sulfone, or sulfolane, more preferably ethyl isopropyl sulfone. From a similar viewpoint, the organic solvent, among the above examples of the ether solvent, is preferably 2-methyl tetrahydrofuran.

Examples of the ionic liquid encompass DEMETFSI (diethylmethyl(2-methoxyethyl)ammonium bis (trifluoromethylsulfonyl)imide), DEMEBF4 (diethylmethyl (2-methoxyethyl)ammonium tetrafluoroborate), EMIBF4 (1-ethyl-3-methylimidazolium tetrafluoroborate), EMITFSI (1-ethyl-3-methylimidazolium(bis(trifluoromethanesulfo-nyl)imide)), EMIFSI (1-ethyl-3-methylimidazolium(bis (fluorosulfonyl)imide)), and the like. Among the above examples of the ionic liquid, from the viewpoint of imparting excellent electrochemical properties to the electrolyte, DEMETFSI is preferable.

Among the above examples of the solvent, the organic solvent or the ionic liquid is preferable from the viewpoint of imparting an excellent electrochemical property to the electrolyte. Further in order to allow the electrolyte to repeatedly have a magnesium dissolution reaction and a magnesium deposition reaction accompanying charge and discharge, the sulfone solvent and the ether solvent are more preferable. Further in order for the electrolyte to have low volatility and low toxicity and allow water to be mixed in the electrolyte, the sulfone solvent is even more preferable.

Therefore, among the above examples of the solvent, methyl isopropyl sulfone, ethyl isopropyl sulfone, dipropyl sulfone, and sulfolane are particularly preferable, and ethyl isopropyl sulfone is even more preferable.

A single one of the above-described solvent may be contained alone, or two or more kinds of the solvent may be contained.

[2. Magnesium Ion]

The electrolyte in accordance with an embodiment of the present invention contains a magnesium ion. In a magnesium secondary battery, metal magnesium of a negative electrode is dissolved into an electrolyte as magnesium ions during discharge, and magnesium ions in the electrolyte are in turn deposited onto the negative electrode as metal magnesium during charge. As such, in order to increase the battery output, it is necessary to achieve a sufficiently high magnesium ion concentration in the electrolyte.

The electrolyte in accordance with an embodiment of the present invention has a magnesium ion concentration of preferably not less than 0.50 mol/L, more preferably not less than 0.55 mol/L, even more preferably not less than 0.75 mol/L relative to a total amount of the electrolyte. An electrolyte having a magnesium ion concentration of not less than 0.50 mol/L allows a battery prepared to exhibit sufficient battery output.

On the other hand, in consideration of time, cost, etc. required for production, it is preferable that the electrolyte in accordance with an embodiment of the present invention have a magnesium ion concentration of approximately not more than 1.00 mol/L relative to a total amount of the electrolyte. Note that this value is merely an example and is not intended to limit the scope of the present invention.

In the electrolyte containing a magnesium ion, the coordination number of each magnesium atom with respect to solvent molecules is preferably 4. Magnesium atoms in such a state are superior to magnesium atoms each having a coordination number with respect to solvent molecules of 6, in terms of (1) exhibiting higher solubility to the solvent and accordingly enabling an increased magnesium ion concentration and (2) exhibiting higher reaction activity, which allows facilitating dissolution and deposition of magnesium accompanying charge and discharge (for details of the above phenomenon, see [Saha P et. al (2014) "Rechargeable magnesium battery: Current status and key challenges for the future", Progress in Materials Science, Vol. 66, pp. 1-86]).

The coordination number of a magnesium atom with respect to a solvent in an electrolyte is known, for example, by soft X-ray fluorescence XAFS method (for detail, see Example 3). By measuring a peak intensity corresponding to a nearest neighboring atom to a magnesium atom, it is possible to calculate a proportion of magnesium atoms having a coordination number of 4.

Note that soft X-ray fluorescence XAFS method is a technique of irradiating a sample with soft X rays and measuring and analyzing fluorescent X-rays which are secondarily released. What kind of structure a certain atom in the sample has is known by analyzing the fluorescent X-rays to find a radial structure function. Details of the theory and methodology are discussed, for example, in "*X-sen kyushu bisai kozo: XAFS no sokutei to kaiseki*" edited by Yasuo Udagawa, Gakkai shuppan center, 1993 and "*X-sen kyushu bunkoho: XAFS to sono oyo*" written and edited by Toshiaki Ohta, IPC, 2002.

In an electrolyte in accordance with an embodiment of the present invention, magnesium atoms having a coordination number of 4 account for preferably not less than 95%, more preferably not less than 97%, even more preferably not less than 99% of the number of all magnesium atoms when the electrolyte is analyzed by soft X-ray fluorescence XAFS method. In a case where magnesium atoms having a coordination number of 4 account for not less than 95% of all magnesium atoms, it is deemed that the solubility of magnesium in the solvent and the reaction activity of magnesium atoms are sufficiently high.

On the other hand, in consideration of time, cost, etc. required for production, it is preferable that magnesium atoms having a coordination number of 4 account for approximately not more than 99.9% of all magnesium atoms in the electrolyte in accordance with an embodiment of the present invention, when the electrolyte is analyzed by soft X-ray fluorescence XAFS method. Note that this value is merely an example and is not intended to limit the scope of the present invention.

[3. Halide Ion]

The electrolyte in accordance with an embodiment of the present invention contains a halide ion. From the viewpoint of preventing corrosion of a magnesium electrode, it is preferable that no unionized elemental halogen be present in the solvent. Note that according to a production method in accordance with an embodiment of the present invention (described later), the elemental halogen is reduced by metal magnesium in the solvent to exist in the state of a halide ion.

As used herein, the term "elemental halogen" refers to a fluorine molecule ($F_2$), a chlorine molecule ($Cl_2$), a bromine molecule ($Br_2$), or an iodine molecule ($I_2$). As used herein, the term "halide ion" refers to a fluoride ion ($F^-$), a chloride ion ($Cl^-$), a bromide ion ($Br^-$), or an iodide ion ($I^-$).

From the viewpoint of stability of the elemental halogen and the halide ion, the halide ion dissolved in the electrolyte in accordance with an embodiment of the present invention is preferably a bromide ion or an iodide ion, more preferably an iodide ion.

The concentration of the halide ion dissolved in the electrolyte in accordance with an embodiment of the present invention is not particularly limited. For an improved yield of the electrolyte, the concentration of the halide ion dissolved in the electrolyte in accordance with an embodiment of the present invention is preferably not less than 0.5 mol/L, more preferably not less than 0.55 mol/L, even more preferably not less than 0.75 mol/L.

On the other hand, in consideration of time, cost, etc. required for production, it is preferable that a concentration of a halide ion in an electrolyte in accordance with an embodiment of the present invention be approximately not more than 0.90 mol/L relative to a total amount of the electrolyte. Note that this value is merely an example and is not intended to limit the scope of the present invention.

A single one of the above-described halide ion may be contained alone, or two or more kinds of the halide ion may be contained.

[4. Another Component]

An electrolyte in accordance with an embodiment of the present invention may contain a component(s) other than the above-described components. Examples of such a component encompass a Lewis base (e.g., magnesium ethoxide) and the like.

[5. Production Method]

A method in accordance with an embodiment of the present invention for producing an electrolyte includes a step of mixing a solvent, metal magnesium, and an elemental halogen. The order of mixing these components is not particularly limited. That is, it is possible to mix the solvent and the metal magnesium first, or mix the solvent and the elemental halogen first, or mix the metal magnesium and the elemental halogen first. Alternatively, the three components may be simultaneously mixed with the solvent. For an improved yield of the electrolyte, it is preferable to mix the elemental halogen and the solvent first and then mix the metal magnesium and the solvent. Note that the method in accordance with an embodiment of the present invention for producing an electrolyte may include other step(s).

According to the method in accordance with an embodiment of the present invention for producing an electrolyte, oxidation-reduction reaction involving the metal magnesium as a reducing agent and the elemental halogen as an oxidizing agent occurs in the solvent, so that magnesium ions are produced. This is significantly different from a conventional production method (e.g., the production method described in Patent Literature 1) in which a magnesium salt is dissolved in a solvent. The inventors of the present invention found that the above-described production method enables production of an electrolyte having a magnesium concentration higher than that in an electrolyte obtained by a conventional production method, and thus completed the present invention.

To prevent reaction with oxygen, nitrogen, water, and a volatile substance of an organic solvent, weighing of the elemental halogen and mixing of the elemental halogen and the solvent are preferably carried out in an inert gas atmosphere. Such an environment may be realized, for example, by using a glove box.

[5-1. Metal Magnesium]

Metal magnesium which is used in a method in accordance with an embodiment of the present invention for producing an electrolyte has a purity which is not particularly limited provided that the metal magnesium is a metal (e.g., a metal containing magnesium in an amount of not less than 95% by weight with respect to 100% by weight of a total weight of the metal) containing magnesium as a main component. From the viewpoint of minimizing an unexpected reaction caused by impurities, the purity of the metal magnesium is preferably not less than 96% by weight, more preferably not less than 98% by weight, even more preferably not less than 99.9% by weight.

On the other hand, in consideration of time, cost, etc. required for production, it is preferable that the purity of the metal magnesium be approximately not more than 99.99% by weight. Note that this value is merely an example and is not intended to limit the scope of the present invention.

The metal magnesium which is used in the method in accordance with an embodiment of the present invention for producing an electrolyte is preferably in large excess with respect to the amount of the elemental halogen (e.g., the molar ratio of the metal magnesium to the elemental halogen is not less than 4:1). In a case where the metal magnesium is in large excess with respect to the amount of the elemental halogen, the elemental halogen is reacted completely. This allows preventing corrosion of an electrode caused by an elemental halogen residue in the solvent.

[5-2. Elemental Halogen]

The elemental halogen which is used in the method in accordance with an embodiment of the present invention for producing an electrolyte is as described in [3] above.

The elemental halogen which is used in the method in accordance with an embodiment of the present invention for producing an electrolyte has a purity which is not particularly limited provided that the elemental halogen is contained as a main component (for example, provided that the elemental halogen is contained in an amount of not less than 99% by weight with respect to 100% by weight of a total weight including a weight of the impurities). From the viewpoint of minimizing an unexpected reaction caused by impurities, the purity of the elemental halogen is preferably not less than 99% by weight, more preferably not less than 99.9% by weight, even more preferably not less than 99.99% by weight.

On the other hand, in consideration of time, cost, etc. required for production, it is preferable that the purity of the elemental halogen be approximately not more than 99.999% by weight. Note that this value is merely an example and is not intended to limit the scope of the present invention.

In the method in accordance with an embodiment of the present invention for producing an electrolyte, a single kind of the elemental halogen may be used alone, or two or more kinds of the elemental halogen may be used in combination.

[5-3. Solvent]

The solvent which is used in the method in accordance with an embodiment of the present invention for producing an electrolyte is as described in [1] above.

[5-4. Example of Production Method]

The method in accordance with an embodiment of the present invention for producing an electrolyte is as follows, for example. A more specific example of the method for producing an electrolyte will be described in [Production example] below.

First, a halogen is added to a solvent and dissolved (or dispersed). Then, to a solution thus obtained, metal magnesium is added. The resultant solution is stirred in an atmospheric pressure to cause oxidation-reduction reaction between the halogen and the metal magnesium in the solvent. The reaction is allowed to progress sufficiently (for approximately 10 hours to 24 hours), so that the electrolyte in accordance with an embodiment of the present invention is successfully produced.

[6. Secondary Battery]

A secondary battery can be prepared by combining a positive electrode and a negative electrode with the electrolyte in accordance with an embodiment of the present invention. The material, shape, and the like of each of the positive electrode, the negative electrode, and other members (e.g., a separator) may be selected as appropriate by a person skilled in the art. A more specific example of the method for preparing a secondary battery will be described in [Example 5] below.

In preparation of a magnesium secondary battery, the material of a negative electrode is typically metal magnesium. The material of a positive electrode is, for example, vanadium pentoxide, molybdenum sulfide, a magnesium-containing oxide, a transition metal oxide, or the like.

Further, since the electrolyte in accordance with an embodiment of the present invention allows water to be contained therein, it is possible to prepare an air secondary battery. In such a case, the material of a negative electrode is typically metal magnesium. The material of a positive electrode (including a catalyst layer) is, for example, carbon (C), a metal such as platinum (Pt), ruthenium (Ru), iridium (Ir), rhodium (Rh), palladium (Pd), osmium (Os), tungsten (W), lead (Pb), iron (Fe), chromium (Cr), cobalt (Co), nickel (Ni), manganese (Mn), vanadium (V), molybdenum (Mo), gallium (Ga), or aluminum (Al), a compound of the metal, an alloy of these metals, or the like. In a case where, for example, carbon is employed as the material of the positive electrode out of these examples, preparation of a secondary battery without use of a rare metal is made possible.

[7. Advantage Over Conventional Technology]

The following description will discuss differences between the conventional technology and a presumably most effective aspect of the present invention. The aspect is an electrolyte which is prepared by dissolving an elemental halogen in a sulfone solvent and then mixing thereto metal magnesium in an amount sufficient to cause the elemental halogen to react completely. Note that depending on various conditions and objects, other aspects can be the most appropriate.

[Achieving all of High Magnesium Ion Concentration, Low Toxicity, and Water Acceptance]

In development of a conventional magnesium ion-containing electrolyte, an ether solvent or a sulfone solvent has been used as a solvent. An electrolyte using an ether solvent, in particular, can achieve a high magnesium ion concentration but has the following disadvantages. That is, the electrolyte has high toxicity and volatility and, when containing water, becomes inactive due to disruption of a coordination structure. The electrolyte using the ether solvent therefore has issues in terms of practical use. An electrolyte using a sulfone solvent, on the other hand, has low toxicity and volatility and allows water to be contained in the electrolyte to a certain extent, but has difficulty achieving a high magnesium ion concentration.

In the conventional technology, magnesium ions in a solvent are produced by dissolving a magnesium salt. Since the magnesium salt has poor solubility to a sulfone solvent, it is necessary to use an auxiliary solvent and/or additive in combination (for example, alcohol is used as an auxiliary solvent in Patent Literature 1).

In contrast, according to the above aspect, it is possible to achieve a high magnesium ion concentration of more than 0.50 mol/L while using a sulfone solvent which can be put to practical use (has a long battery life). Further, since magnesium ions are produced without use of an auxiliary solvent and/or additive, it is possible to reduce the number of production steps.

[Reduction of Overvoltage]

In general, a magnesium secondary battery has a problem (overvoltage) that even at an electric potential difference at which magnesium dissolution or deposition occurs, a reaction resistance prevents an electric current from generated. To solve this problem, there is a technique of letting an elemental halogen coexist in the electrolyte (e.g., Patent Literature 2). This technique, however, has a problem that the elemental halogen causes corrosion of the magnesium electrode.

According to the above aspect, on the other hand, an elemental halogen completely reacts at the production stage, and thus no corrosion of the electrode occurs. In addition, as described later in the Examples, overvoltage hardly occurs or occurs only to a small extent with a small value.

[High Actual Capacity]

The above aspect has recorded an actual capacity that is high for a magnesium electrode/magnesium-containing electrolyte system. A theoretical capacity of a magnesium electrode/magnesium-containing electrolyte system (amount of electricity available in a case where a magnesium electrode is entirely dissolved and deposited) is 3881 mAh/cm$^3$. With the above aspect, an actual capacity equivalent to a utilization rate of 50% (1941 mAh/cm$^3$) was successfully exhibited at a cycle efficiency of 99.8% (see Example 4-1).

[8. Other Aspects of the Present Invention]

In other aspects of the present invention, the present invention encompasses the following.

<1> An electrolyte containing a solvent, a magnesium ion, and a halide ion.

<2> The electrolyte as set forth in <1>, containing the magnesium ion in an amount of not more than 0.5 mol/L relative to a total amount of the electrolyte.

<3> The electrolyte as set forth in <1> or <2>, wherein the number of magnesium atoms having a coordination number of 4 is not less than 95% of the number of all magnesium atoms when the electrolyte is analyzed by soft X-ray fluorescence XAFS method.

<4> The electrolyte as set forth in any one of <1> through <3>, wherein the solvent is an organic solvent or an ionic liquid.

<5> The electrolyte as set forth in any one of <1> through <4>, wherein the solvent is a sulfone solvent.

<6> The electrolyte as set forth in any one of <1> through <5>, wherein the halide ion is a bromide ion or an iodide ion.

<7> A secondary battery, including an electrolyte according to any one of <1> through <6>.

<8> A method for producing an electrolyte, including the step of: mixing a solvent, metal magnesium, and an elemental halogen.

<9> The method as set forth in <8>, wherein the electrolyte contains a magnesium ion in an amount of not less than 0.5 mol/L relative to a total amount of the electrolyte.

<10> The method as set forth in <8> or <9>, wherein the number of magnesium atoms having a coordination number of 4 is not less than 95% of the number of all magnesium atoms when the electrolyte is analyzed by soft X-ray fluorescence XAFS method.

<11> The method as set forth in any one of <8> through <10>, wherein the solvent is an organic solvent or an ionic liquid.

<12> The method as set forth in any one of <8> through <11>, wherein the solvent is a sulfone solvent.

<13> The method as set forth in any one of <8> through <12>, wherein the elemental halogen is a bromine molecule or an iodine molecule.

EXAMPLES

Production Example

The electrolyte in accordance with an embodiment of the present invention was prepared by the following method. Measurement of a reagent and mixing of the reagent and a solvent were carried out inside a glove box (in an argon atmosphere and at a dew point of −80° C. to −90° C.

For use as a solvent, 10 mL of ethyl isopropyl sulfone (manufactured by Tokyo Chemical Industry Co., Ltd.) dehydrated with use of a molecular sieve was measured. To the solvent being stirred with a stirrer, 1.27 g of iodine (manufactured by Wako Pure Chemical Industries, Ltd.) was added. After the iodine was completely dispersed in the solvent, 0.486 g of metal magnesium powder was added. As the reaction progressed, fading of a purple color derived from the iodine was observed. Approximately 12 hours after the addition of the metal magnesium powder, the purple color completely disappeared and the solution became transparent. At that point, it was determined that the reaction had completed. The solution was taken out of the glove box while maintained in a state of being shielded from the atmosphere, and was subjected to centrifugal separation (7500 rpm, 15 minutes) with use of a centrifugal separator (manufactured by AS ONE Corporation, "AS165W"). Thus obtained was the electrolyte in accordance with an embodiment of the present invention (hereinafter, "electrolyte A") as a supernatant liquid resulting from precipitation of unreacted metal magnesium.

The electrolyte A thus prepared had a magnesium concentration of 0.55 mol/L. It was confirmed that the magnesium concentration could be increased to a maximum of 3.5 mol/L by a similar production method.

Example 1

To study an electrochemical characteristic of the electrolyte A, cyclic voltammetry (CV) measurement was conducted.

For the measurement, a three-electrode cell (the amount of electrolyte: 0.7 mL; manufactured by BAS Inc., "VC-4"). As a working electrode, a nickel (Ni) substrate (diameter: 10 mm) was used. As a counter electrode and a reference electrode, a magnesium (Mg) pellet (diameter: 12 mm; manufactured by RARE METALLIC Co., Ltd.) and a magnesium wire (diameter: 1.6 mm; manufactured by RARE METALLIC Co., Ltd.) were used, respectively. The measurement was conducted at room temperature and under atmospheric pressure.

The measurement was conducted by sweeping an electric potential on the following cycle.
(1) In the beginning, an open circuit state (OCV) between the electrodes was established.
(2) First, the electric potential of the working electrode with respect to the electric potential of the reference electrode was lowered toward a reduction side down to −0.7 V. During this time, magnesium ions were deposited as metal magnesium.
(3) Subsequently, the electric potential of the working electrode with respect to the electric potential of the reference electrode was elevated toward an oxidation side up to 2.0 V. During this time, metal magnesium was dissolved as magnesium ions.
(4) Lastly, the OCV between the electrodes was restored.

That is, the electric potential of the working electrode relative to the electric potential of the reference electrode was changed in the following order: OCV→−0.7 V→approximately +1.0 V to 2.0 V→OCV. The rate of sweeping the electric potential was 20 mV/s.
(Result)

Figure 1:
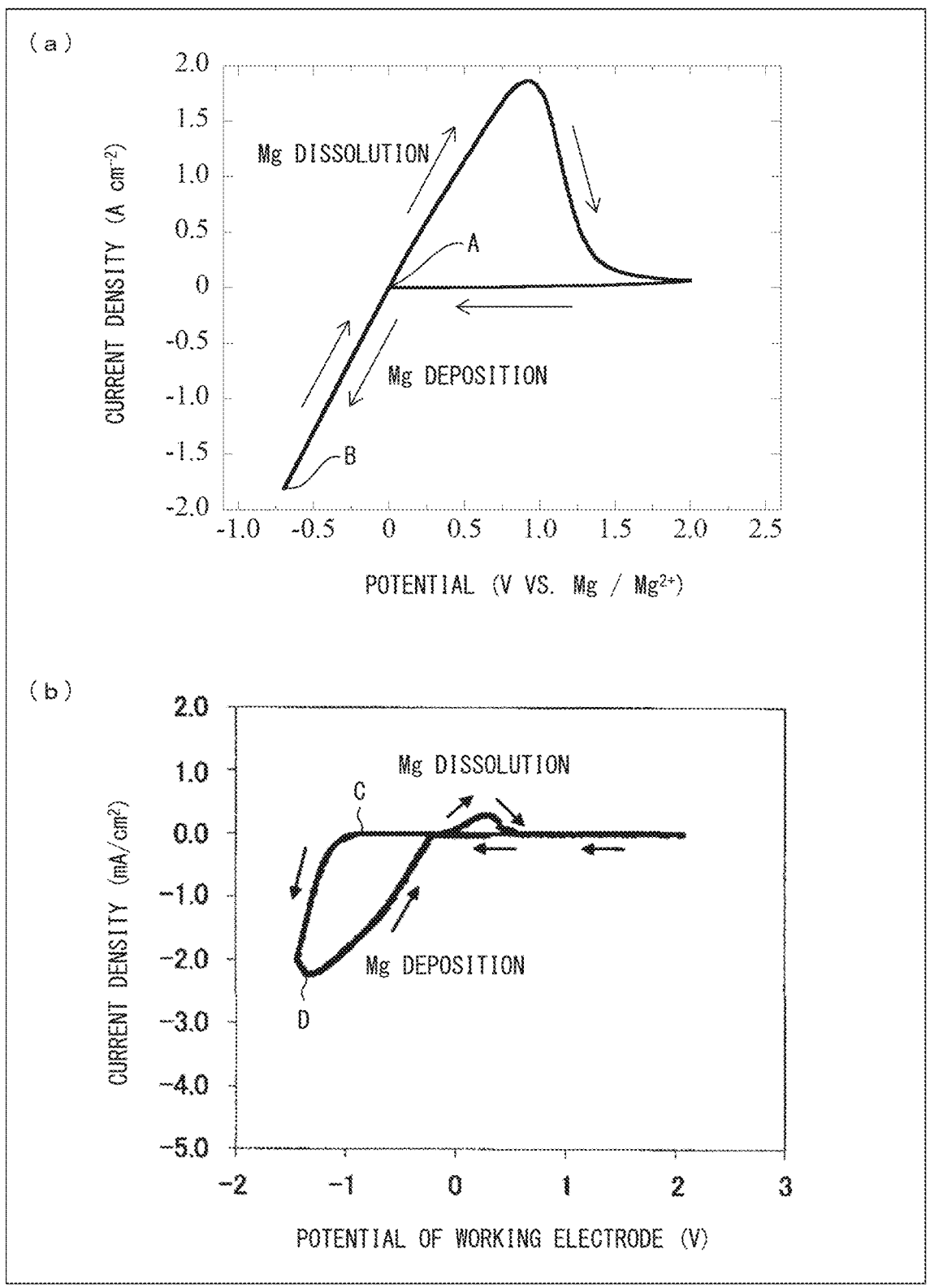

The results are indicated by a cyclic voltamogram shown in (a) of FIG. 1. According to (a) of FIG. 1, as the electric potential was swept in a negative direction, a response current generated from a point in time where the electric potential became 0 V (see point A). This suggests that at a theoretical electric potential at which magnesium deposition was thermodynamically supposed to start, magnesium deposition actually started. That is, it is suggested that a magnesium deposition reaction progressed without occurrence of overvoltage. Similarly, it is understood from (a) of FIG. 1 that as the electric potential was swept in a positive direction, a magnesium dissolution reaction progressed without occurrence of overvoltage (see point B).

In contrast, a cyclic voltamogram regarding the electrolyte described in Patent Literature 1, which concerns conventional technology, is shown in (b) of FIG. 1. The electrolyte was prepared by (i) dissolving magnesium chloride (II) in dehydrated methanol, (ii) further mixing the resultant solution with ethyl-n-propyl sulfone (EnPS), and (iii) then removing the methanol by depressurization.

According to (b) of FIG. 1, as the electric potential was swept in a negative direction, a response current generated approximately from a point in time where the electric potential became −1 V (see point C). That is, in a range between 0 V and 1 V, a reaction resistance occurred and thus deposition of magnesium had not started (overvoltage occurred). Similarly, as the electric potential was swept in a positive direction, occurrence of overvoltage was observed, although to a small extent (see point D). This difference is likely to stem from the fact that the electrolyte described in Patent Literature 1 contains both magnesium atoms each 6-coordinated by solvent molecules and magnesium atoms each 4-coordinated by solvent molecules.

Further, the electric current density in (a) of FIG. 1 is of an order of $A/cm^2$, whereas the electric current density in (b) of FIG. 1 is of an order of $mA/cm^2$. That is, the electrolyte A successfully extracted an electric current of approximately 1000 times the amount of the electric current extracted by the conventional technology.

Example 2

Deposition of metal magnesium from the electrolyte A was confirmed.

Example 2-1

Deposition of metal magnesium was confirmed with use of an electron microscope.

The electrolyte A was introduced into a three-electrode cell (the amount of electrolyte: 2.0 mL; manufactured by BAS Inc., "VC-4"). A nickel electrode was inserted as a working electrode, and magnesium metal was inserted as a counter electrode and a reference electrode. Then, an electric current of 1 $mA/cm^2$ was passed between the working electrode and the counter electrode for 10 minutes. Subsequently, the working electrode to which deposits were attached was cleaned by being immersed in EiPS and was dried under reduced pressure. Then, the deposits on the working electrode were observed with use of a scanning electron microscope (manufactured by Hitachi hightech). The electron gun filament had an acceleration voltage of 15 kV and an electric current of 40.0 mA.
(Result)

Figure 2:
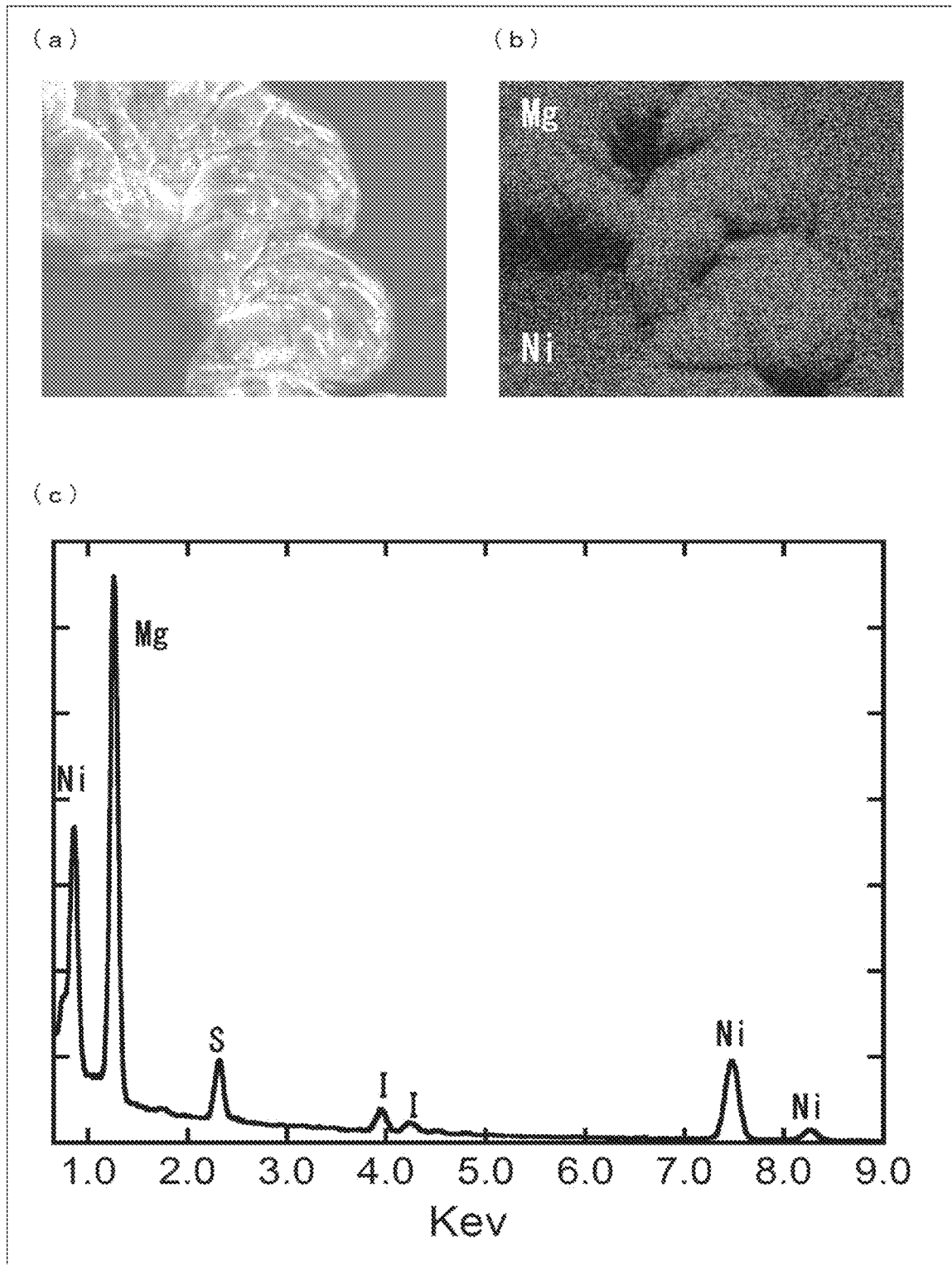

An electron microscopic image thus captured is shown in (a) of FIG. 2. In a center part of the screen, deposited metal magnesium (bright portion) is observed. Note that dark portions represent nickel of the working electrode.

Example 2-2

With use of an energy dispersive X-ray analyzer (manufactured by EDAX Japan, "Genesis XM2"), energy dispersive X-ray spectroscopy (EDX) was conducted to analyze what element the deposits were made of.
(Result)

(b) of FIG. 2 illustrates a result of mapping analysis with respect to the same area as that shown in (a) of FIG. 2. The result revealed that what was shown in (a) of FIG. 2 was metal magnesium deposited on a nickel substrate. A mapping spectrum of the deposits is shown in (c) of FIG. 2. As understood from (c) of FIG. 2, a spectrum unique to magnesium was detected to a significant extent. Note that S indicates a spectrum derived from the sulfone solvent, and I indicates a spectrum derived from the electrolyte. These results revealed that metal magnesium was deposited on the electrode.

Example 3

The electrolyte A was analyzed by soft X-ray XAFS method to study the states of magnesium atoms contained in the electrolyte A.

0.2 mL of the electrolyte A was introduced into a sample holder made of stainless steel and having a Be window, and was analyzed by soft X-ray XAFS analysis equipment (Photon Factory of High Energy Accelerator Research Organization, "BL-11"). The energy range analyzed was 1250 eV to 1550 eV. From fluorescent X-rays obtained, K-absorption of magnesium was collected and analyzed using data processing software ATHENA to obtain a radial structure function.

As a control sample, a magnesium perchlorate aqueous solution was analyzed by soft X-ray XAFS method to obtain a radial structure function. The magnesium perchlorate aqueous solution had been prepared by dissolving magnesium perchlorate (manufactured by Wako Pure Chemical Industries, Ltd.) in water so as to obtain 0.55 M aqueous solution and then stirring the aqueous solution using a stirrer in the atmosphere. Note that it is known that a magnesium atom in a magnesium perchlorate aqueous solution is 6-coordinated by water molecules.

(Result)

Figure 3:
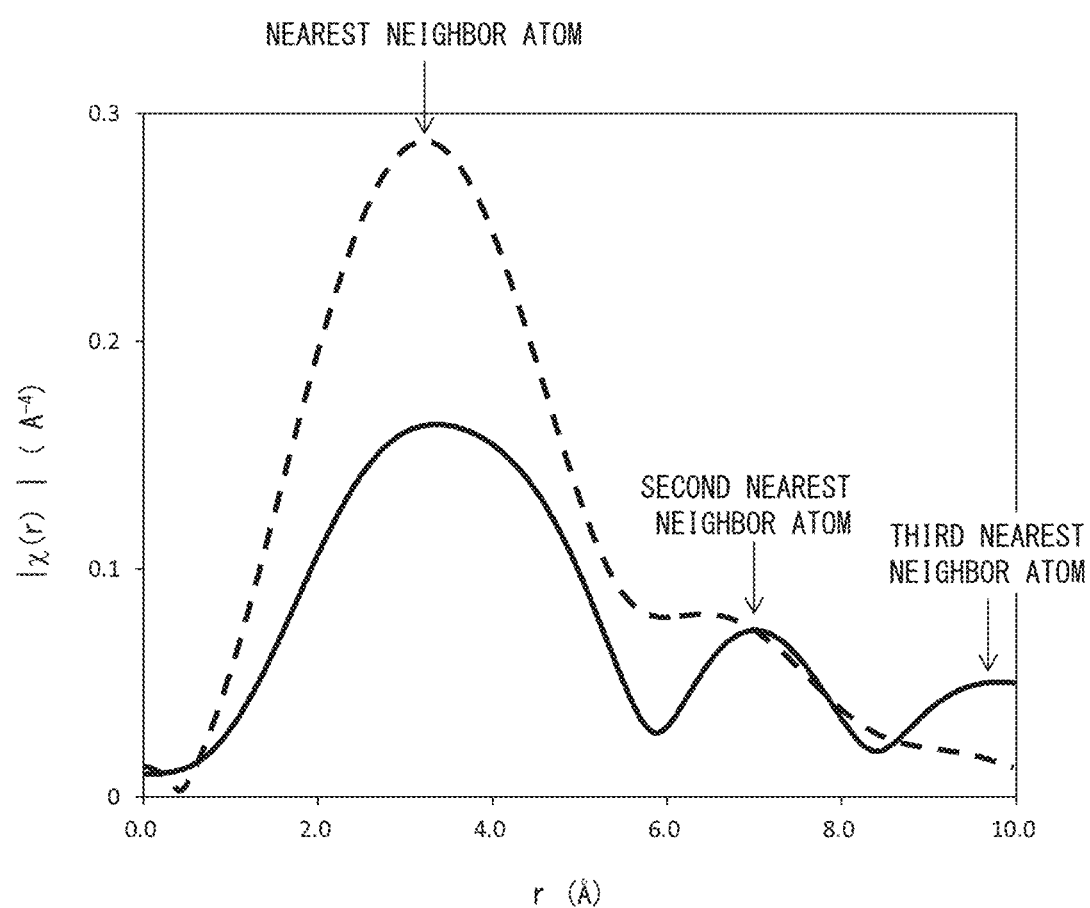

FIG. 3 illustrates the radial structure function of the electrolyte A (solid line) and the radial structure function of the magnesium perchlorate aqueous solution (broken line). The horizontal axis of the graph represents a distance from a center of a magnesium atom. An intensity of a peak of each radial structure function is correlated with the number of atoms. Since it is known that a magnesium atom in a magnesium perchlorate aqueous solution is 6-coordinated by water molecules, the broken line can be understood as a function corresponding to a case in which a magnesium atom is 6-coordinated.

Comparison between the electrolyte A and the magnesium perchlorate aqueous solution in terms of an intensity of a peak corresponding to a nearest neighboring atom (a peak in the vicinity of 3 Å) of the radial structure function shows that a ratio of the peak intensity of the electrolyte A and the peak intensity of the magnesium perchlorate aqueous solution is 4.015:6.000. That is, four atoms are present in the vicinity of each of most magnesium atoms in the electrolyte A. This suggests that four sulfone solvent molecules are coordinated around each of those magnesium atoms.

From calculation based on the assumption that the coordination number of each magnesium atom with respect to solvent molecules is 4 or 6, it is understood that 99.25% of the entire magnesium atoms are 4-coordinated and 0.75% of the entire magnesium atoms are 6-coordinated. As described above, 4-coordinated magnesium has high solubility to a solvent and exhibits high reaction activity. Therefore, the electrolyte A can be considered to be in a preferable state as an electrolyte.

Example 4

Example 4-1

The electrolyte A was subjected to a constant current charge and discharge test under conditions of an assumed case in which a battery including the electrolyte A operates.

0.5 mL of the electrolyte A was introduced into a two-electrode cell (manufactured by Hohsen Corporation). A nickel electrode was inserted as a working electrode, and magnesium metal was inserted as a counter electrode. Prior to repeating charge and discharge, 10 C/cm$^2$ of preliminary charge was initially conducted to cause metal magnesium to be deposited. Subsequently, a charge and discharge situation was reproduced by repeating a set of operations (1) and (2). In the operation (1), an electric current of 1.0 mA/cm$^2$ was passed from the working electrode to the counter electrode for 500 seconds. In the operation (2), an electric current of 1.0 mA/cm$^2$ was passed from the working electrode to the counter electrode for 500 seconds. Note that the electric currents passed under the above conditions are electric currents corresponding to repeated dissolution and deposition of 5% of the metal magnesium initially deposited. The charge-discharge cycle was repeated until it was no longer possible to repeat dissolution and deposition of metal magnesium. Cycle efficiency was calculated by the following equation:

$$\text{Cycle efficiency} = \frac{y_{discharge} - \frac{x}{N}}{y_{charge}}$$

where N represents the number of cycles, x represents an amount of electricity (C/cm$^2$) charged per unit area by the preliminary charge, y (charge) represents an amount of electricity (C/cm$^2$) used to cause Mg to be deposited on the working electrode, and y (discharge) represents an amount of electricity (C/cm$^2$) used to cause Mg deposited on the working electrode to be dissolved.

(Result)

Figure 4:
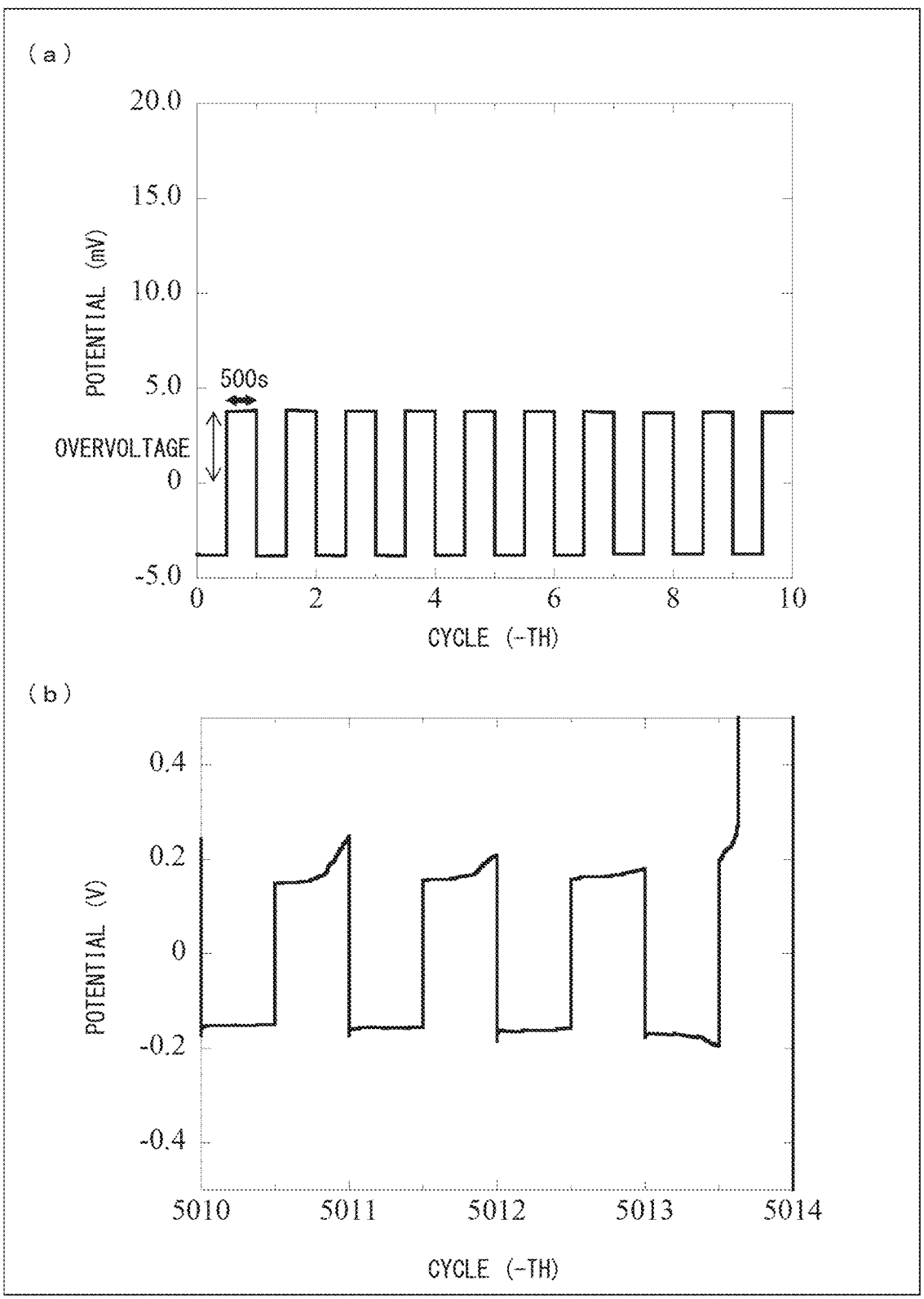

Progress is shown in graphs illustrated in (a) and (b) of FIG. 4. In a part where the electric potential is constant, dissolution or deposition of magnesium is occurring. In this test, dissolution or deposition of magnesium was successfully repeated until the 5000th cycle was reached. From this result, a cycle efficiency of 99.8% is calculated, and likewise, an actual capacity of 1940 mAh/cm$^3$ is calculated. Note that overvoltage of approximately 4 mV occurred in the test.

Example 4-2

The electrolyte A was subjected to a constant current charge and discharge test under other conditions of an assumed case in which a battery including the electrolyte A operates. Specifically, the constant current charge and discharge was conducted under the same conditions as Example 4-1 except that a length of time of passing an electric current was changed to 5000 seconds. The electric currents passed under the above conditions are electric currents corresponding to repeated dissolution and deposition of 50% of the metal magnesium initially deposited. Note that the number of charge-discharge cycles in Example 4-2 was 1100 so that cycle efficiency in Example 4-2 is adjusted to be equivalent to that of Example 4-1.

(Result)

Figure 5:
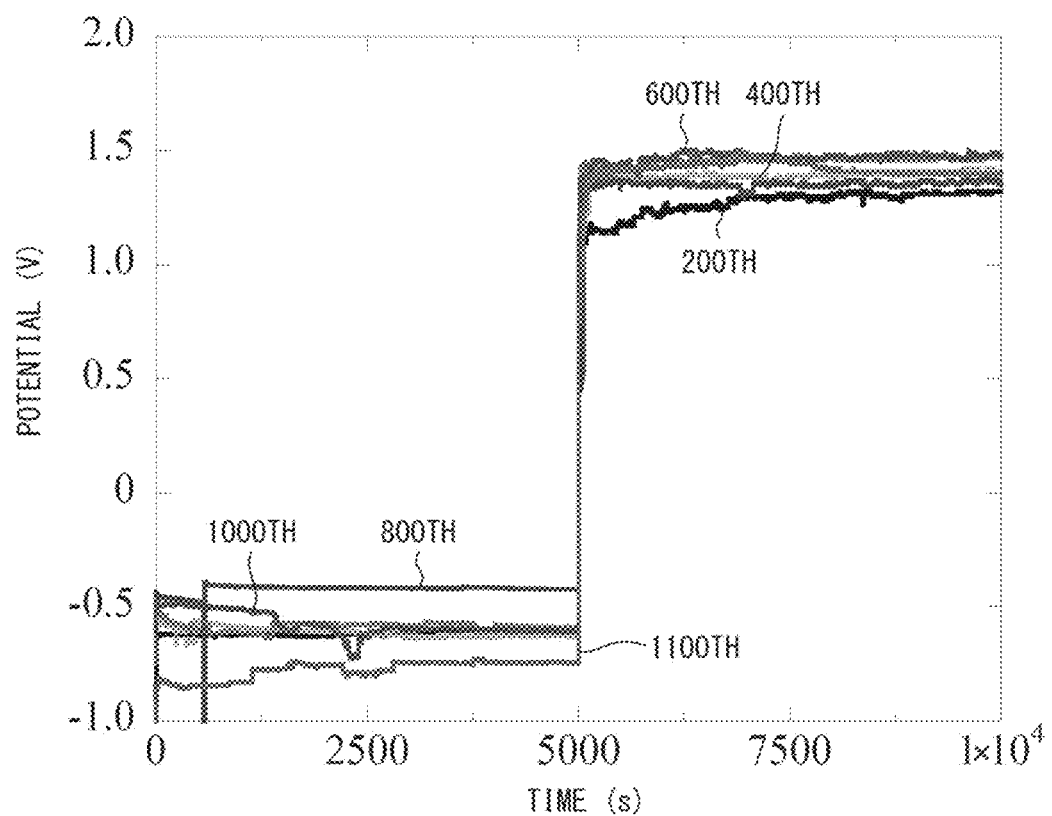
FIG. 5 is a graph showing behaviors as of 200th, 400th, 600th, 800th, 1000th, and 1100th cycles, respectively, in a case where an electrolyte in accordance with an embodiment of the present invention was subjected to a constant current charge and discharge test under conditions different from those of FIG. 4.

FIG. 5 shows progresses as of 200th, 400th, 600th, 800th, 1000th, and 1100th cycles, respectively. It is understood from FIG. 5 that behaviors of dissolution and deposition of metal magnesium remained stable despite the repetitions of the charge-discharge cycle. An actual capacity when the 1100th cycle was reached was 50 mAh/cm³. Note that overvoltage occurred in the test was approximately 1 mV.

Example 5

Figure 6:
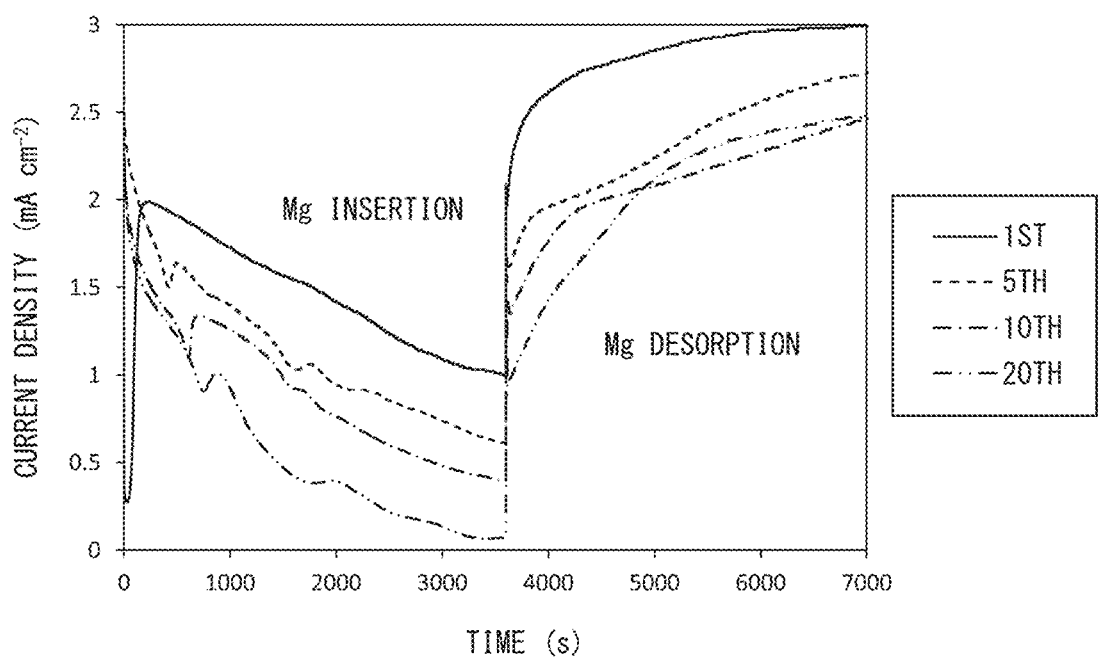
FIG. 6 is a graph showing behaviors as of 1st, 5th, 10th, and 20th cycles, respectively, in a case where a secondary battery prepared with use of an electrolyte in accordance with an embodiment of the present invention as an electrolyte, vanadium pentoxide as a positive electrode, and metal magnesium as a negative electrode was subjected to a constant current charge and discharge test.

A magnesium secondary battery was prepared by combining the electrolyte A, a negative electrode, and a positive electrode. Further, the magnesium secondary battery was subjected to a constant current charge and discharge test.
[Preparation of Battery]
A coin cell was prepared with use of magnesium (Mg) as a negative electrode, vanadium pentoxide ($V_2O_5$) as a positive electrode, and the electrolyte A as an electrolyte. A method employed for the preparation of the coin cell is as follows. A gasket was placed on a coin cell can. On this gasket, a positive electrode (a $V_2O_5$ pellet of 30 μm in thickness), a polyolefin separator, a negative electrode (a Mg pellet of 200 μm in thickness), a spacer (a stainless steel plate of 500 μm in thickness), a washer, and a coin cell lid were further placed in this order. Subsequently, 100 μL of the electrolyte A was introduced into the coin cell can, and the coil cell can was sealed by caulking.
[Constant Current Charge and Discharge Test]
The magnesium secondary battery prepared by the above method was subjected to 20 cycles of a set of operations (1) and (2). In the operation (1), the magnesium secondary battery was charged with an electric current of 1.0 mA/cm² for 3600 seconds. In the operation (2), the magnesium secondary battery was discharged with an electric current of 1.0 mA/cm² for 3600 seconds.
(Result)
FIG. 6 shows progresses as of 1st, 5th, 10th, and 20th cycles, respectively. The positive electrode of the battery prepared in Example 5 went through repetitions of a magnesium insertion reaction: $V_2O_5 + nMg^{2+} + 2ne^- \rightarrow MgnV_2O_5$ and a magnesium desorption reaction: $MgnV_2O_5 \rightarrow V_2O_5 + nMg^{2+} + 2ne^-$. It is observed in FIG. 6 that curves corresponding to the magnesium insertion reaction and the magnesium desorption reaction were obtained despite the repetitions of the charge-discharge cycle. This indicates that the reactions were stable.

Example 6

Example 6-1

The type of solvent was changed to prepare electrolytes with use of respective different solvents. Each of the electrolytes thus prepared was subjected to cyclic voltammetry. Specifically, the solvent employed in the production example above was replaced with (a) 2-methyl tetrahydrofuran (ether solvent; manufactured by Tokyo Chemical Industry Co., Ltd.), (b) methyl isopropyl sulfone (MiPS; sulfone solvent; manufactured by Tokyo Chemical Industry Co., Ltd.), and (c) sulfolane (sulfone solvent; manufactured by Tokyo Chemical Industry Co., Ltd.) to prepare electrolytes with use of the respective solvents. Each of the electrolytes was subjected to cyclic voltammetry measurement in the same manner as Example 1, except that measurement of the electrolyte prepared with use of 2-methyl tetrahydrofuran as a solvent was carried out in an ultra-low-humidity environment inside a glove box.
(Result)
Cyclic voltamograms corresponding to the respective electrolytes are illustrated in (a) through (c) of FIG. 7. It is understood from (a) through (c) of FIG. 7 that despite the change of the solvent in preparation of an electrolyte, no change occurred in electric potential at which magnesium dissolution starts and in electric potential at which magnesium deposition starts. It is also understood that no overvoltage state occurred. This fact suggests that the electrolytes were similar in structure of a magnesium complex which is related to magnesium dissolution and deposition (the structure is presumably a 4-coordination structure coordinated by solvent molecules).

Example 6-2

The elemental halogen was changed to a bromine molecule and the type of solvent was changed to various solvents to prepare electrolytes with use of the bromine and the respective different solvents. Each of the electrolytes was subjected to cyclic voltammetry. Specifically, iodine employed in the production example above was replaced with bromine (5 g; manufactured by Wako Pure Chemical Industries, Ltd.) and the solvent was replaced with (a) DEMETFSI (diethylmethyl(2-methoxyethyl)ammonium bis (trifluoromethylsulfonyl)imide; ionic liquid; manufactured by KISHIDA CHEMICAL Co., Ltd.), (b) methyl isopropyl sulfone (MiPS; sulfone solvent; manufactured by Tokyo Chemical Industry Co., Ltd.), (c) dipropyl sulfone (DnPS; sulfone solvent; manufactured by Tokyo Chemical Industry Co., Ltd.), and (d) sulfolane (sulfone solvent; manufactured by Tokyo Chemical Industry Co., Ltd.) to prepare electrolytes with use of bromine and the respective solvents. Each of the electrolytes was subjected to cyclic voltammetry measurement in the same manner as Example 1.
(Result)
Cyclic voltamograms corresponding to the respective electrolytes are illustrated in (a) through (d) of FIG. 8. It is understood from (a) through (d) of FIG. 8 that despite the changes of the elemental halogen and the solvent in preparation of an electrolyte, substantially no change from Example 1 was observed in electric potential at which magnesium dissolution starts and in electric potential at which magnesium deposition starts, in all of the cases of electrolyte preparation except for the case in which the solvent used was DEMETFSI. Likewise, it is also understood that no overvoltage state occurred in all of the cases of electrolyte preparation except for the case in which the solvent used was DEMETFSI. Further, even in the case of using DEMETFSI as a solvent, a response current generated approximately from a point in time where the electric potential became −0.5 V. That is, magnesium dissolution started earlier than in conventional technology (see, for example, (b) of FIG. 1). This fact suggests that the electrolytes were similar in structure of a magnesium complex related to magnesium dissolution and deposition (the structure is presumably a 4-coordination structure coordinated by solvent molecules).

INDUSTRIAL APPLICABILITY

The present invention is applicable, for example, to a magnesium secondary battery.

The invention claimed is:
1. A method for producing a magnesium secondary battery, comprising the step of:
producing an electrolyte by mixing a sulfone solvent, metal magnesium, and an elemental halogen, wherein the molar ratio of the metal magnesium to the elemental halogen is not less than 4:1; wherein the metal mag- nesium is a metal containing magnesium in an amount of not less than 96% by weight with respect to a total weight of the metal; and combining a positive electrode and a negative magnesium electrode with the electrolyte.

2. The method as set forth in claim 1, wherein the electrolyte contains a magnesium ion in an amount of not less than 0.5 mol/L and not more than 3.5 mol/L relative to a total amount of the electrolyte.

3. The method as set forth in claim 1, wherein the number of magnesium atoms having a coordination number of 4 is not less than 95% of the number of all magnesium atoms when the electrolyte is analyzed by soft X-ray XAFS method.

4. The method as set forth in claim 1, wherein the elemental halogen is a bromine molecule or an iodine molecule.

5. The method as set forth in claim 1, wherein the solvent is methyl isopropyl sulfone or ethyl isopropyl sulfone, and the elemental halogen is a bromine molecule or an iodine molecule.

6. The method as set forth in claim 1, wherein the solvent is selected from the group consisting of methyl isopropyl sulfone, ethyl isopropyl sulfone, dipropyl sulfone and sulfolane.

7. The method as set forth in claim 6, wherein the solvent is ethyl isopropyl sulfone.

\* \* \* \* \*